March 24, 1953  H. H. McCHESNEY  2,632,328
GAS METER CONNECTION MEANS
Filed March 3, 1950
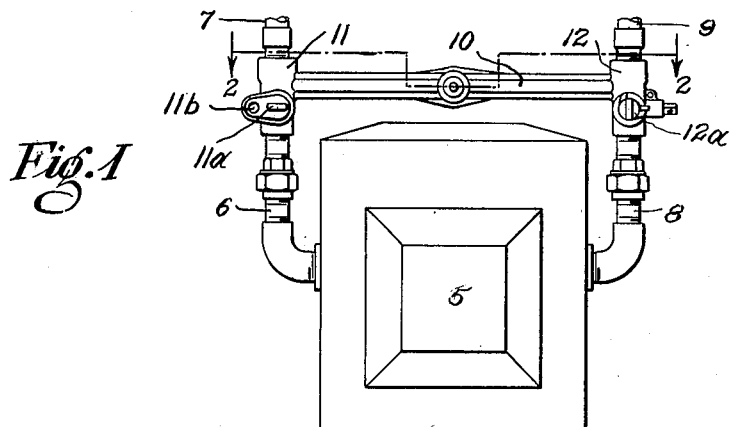
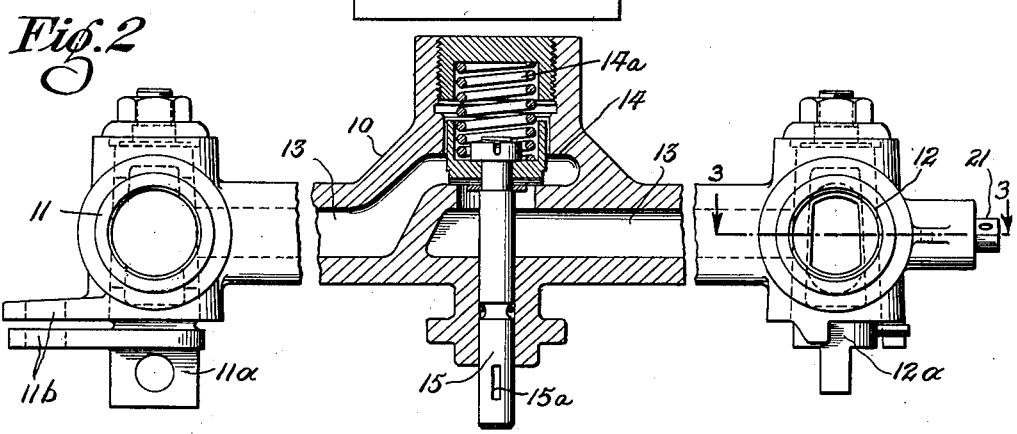
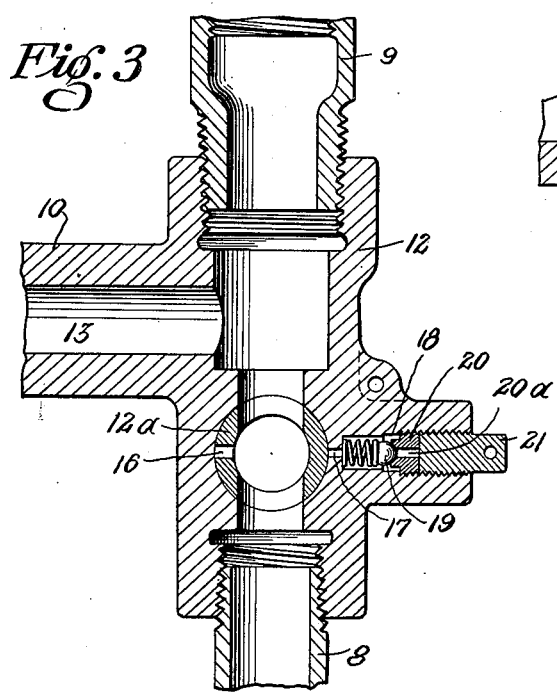
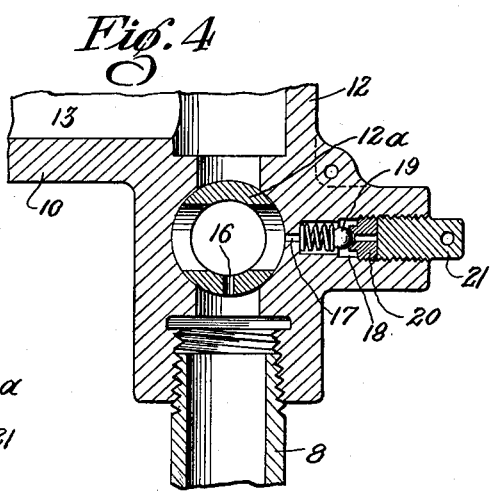
Inventor
Howard H. McChesney
by
Synnestvedt & Lechner
Attorneys Patented Mar. 24, 1953

2,632,328

UNITED STATES PATENT OFFICE 2,632,328

GAS METER CONNECTION MEANS

Howard Hazen McChesney, Bala-Cynwyd, Pa., assignor to The Welsbach Corporation, Philadelphia, Pa., a corporation of Delaware Application March 3, 1950, Serial No. 147,356

4 Claims. (Cl. 73—201)

This invention relates to means for connecting or coupling a gas meter in the service line and more particularly to an improved type of meter connection bar for this purpose.

Before proceeding with a description of the invention I wish to call attention to the fact that it is generally routine practice for the utility companies periodically to remove and replace their consumers' meters for any tests or repairs which may be required. In order to accomplish this, it has been customary to shut off the gas completely ahead of the meter which, of course, makes it necessary afterwards to relight all open outlets such as pilot lights, heater burners, etc. This requires access to the consumer's premises, which access, especially in the case of apartment installations, is frequently not available upon first coverage of a prescribed route thus necessitating repeated calls or advance notice to the consumer. Naturally this constitutes a considerable inconvenience not only to the utility company but also, many times, to the consumer. Furthermore, repetition of calls increases maintenance costs.

The principal object of my invention is to provide meter connection means which will eliminate the inconveniences above mentioned and make it possible for a utility company to service its meters, especially in many of the apartment installations, without the necessity of having the consumer present in order to give access to the premises for the purpose of turning off all lighted burners before the meter is removed and relighting them after replacement. This eliminates the danger of filling the premises with gas through any open unlighted burners and avoids possible explosions, injury to health and even death by asphyxiation.

More specifically, it is the purpose of my invention to attain the foregoing objects by means of an improved meter connection bar in which all of the necessary parts are incorporated so that the equipment can be handled and installed as a unit which makes for greater convenience in the servicing of meters and also reduces maintenance costs as already indicated.

How the objects and advantages of the invention are attained is illustrated in a preferred embodiment in the accompanying drawing wherein Figure 1 is a front elevation of a meter installation incorporating the improved connection means of my invention;

Figure 2 is a somewhat enlarged section taken as indicated by the line 2—2 of Figure 1;

Figure 3 is a section on the line 3—3 of Figure 2; and

Figure 4 is a partial section similar to that of Figure 3 but illustrating the service valve in its closed position.

The meter 5 receives the gas through the inlet pipe 6 which is connected to the supply line 7 and the gas is discharged from the meter through the pipe 8 which delivers to the service line 9.

In the embodiment illustrated, the connection means includes the bar 10 having an end piece 11 on the supply side and a corresponding end piece 12 on the service side. The end pieces provide passages which are internally threaded above and below as viewed in Figure 1 to receive the pipes 7 and 6 upon the inlet side of the meter and the pipes 9 and 8 on the outlet side. In the lower portion of the end piece 11 is located a gas supply control valve 11a and in the lower portion of the end piece 12 is another valve 12a which controls delivery to the service pipe 9. The valve 11a is of familiar construction and can be locked in closed position by means of a suitable key (not shown) adapted to be passed through the apertured wings 11b.

Interiorly the bar 10 is provided with a by-pass passage 13 which extends between the supply side 7 and the service side 9 so that gas may be delivered from the supply pipe to the service pipe without passing through the meter. The by-pass is controlled by means of a valve 14 having an actuating stem 15 which projects through a suitably packed opening in the meter bar 10. Normally this valve is held in closed position by a compression spring 14a and it may be opened by pushing on the stem. During normal service it may be locked in its closed position by inserting a suitable key (not shown) into the slot 15a in the stem.

On the service side the valve 12a is provided with a relatively small capacity passage-way 16 which is normally blanked or closed off when the valve 12a is in its open or service supplying position as shown in Figure 3. When the valve 12a is turned to the position which closes the service line 8—9, as shown in Figure 4, this passage-way 16 will serve to permit flow through the valve to the vent passage-way 17, which latter discharges through a side opening 18 in the end piece 12. The opening 18 is interiorly threaded and at the inner end is provided with a spring-held check valve 19 which fits against a cooperating seat member 20. As a safety measure the outer end of the opening 18 is provided with a closure plug 21 which positively seals against loss of gas in case the check valve fails to function. This plug may be provided with a seal wire in order to discourage unauthorized removal thereof.

To summarize, my equipment functions as follows. During service use of the meter the valve 11a is unlocked and turned to open position. The valve 12a is also turned to its open position while the valve 14 in the by-pass is locked in its closed position. Under these conditions all gas which is being consumed must pass through the meter. When inspection, replacement or repair becomes necessary, the service operator first unlocks and opens the valve 14, thus allowing some of the gas to by-pass the meter. He then closes the valves 11a and 12a and thereby forces all of the gas being consumed to flow through the by-pass. This makes it possible to disconnect the meter from the line without disturbing any outlets which may be burning. Upon replacement of the meter the side outlet 17—18 is first opened by removal of the pipe plug 21 whereupon access may be had to the check valve 19 which can be displaced from its seat by inserting an appropriate device through the opening 20a in the seat member 20. At the same time, and preferably by means of a suitable conduit which forms a part of the device for displacing the check valve, any discharge from the meter may be carried of to a safe location for the purpose of what is known as "light off." Following this the operator opens the supply valve 11a so that gas can flow through the meter and since, at this time, the outlet 17—18 is open, any air in the meter will be exhausted therethrough, following which gas will also escape and this can be determined by "lighting off" or otherwise in any manner familiar to the art. When the meter is thus determined to be thoroughly "gassed," the valve 12a is opened and the valve 14 is closed and locked, thus once more forcing all gas being consumed to pass through the meter. The opening of the valve 12a will automatically shut off access through the vent passage-way 17 and outlet 18 whereupon the "lighting off" device may be removed and the side outlet again closed and sealed by the plug 21.

It will thus be seen that by means of my improved connection equipment it is possible to remove and replace a gas meter without the necessity of gaining access to the premises. It will also be seen that I have provided a very convenient piece of equipment for accomplishing this result, namely, a meter connection bar which can be handled as a unit.

I claim:

1. Means for connecting a gas meter with the gas supply pipe and with the gas service pipe, said means comprising a valve body and a valve member in the gas supply pipe, a valve body and a valve member in the gas service pipe, conduit means providing a by-pass passageway extending from the supply side of the supply valve body to the service side of the service valve body, a valve normally closing said by-pass conduit means, the service valve body being formed to provide a vent passageway extending from the service valve member to the atmosphere, said valve member being formed to provide a small capacity passageway connecting the meter to said vent passageway when the service valve member is in position to close the gas service pipe, and a valve stem for opening the by-pass valve.

2. Gas meter connection means according to claim 1 having, in addition, a check valve normally closing said vent passage-way together with means providing access thereto whereby the check valve may be held in open position.

3. A gas meter connection bar having at one end a valve body and a valve member therein for connecting the gas supply pipe to the inlet side of the meter; a second valve body with a valve member therein at the other end of said bar for connecting the outlet side of the meter to the service pipe; there being a by-pass passage-way extending from the supply side of the supply valve body to the service side of the service valve body; a valve normally closing said by-pass passage-way; said second valve body being formed to provide a vent passage-way extending from the service valve member to the atmosphere; said service valve member being formed to provide a small capacity passage-way connecting the meter to said vent passage-way when the service valve member is in position to close the gas service pipe; and a valve stem for opening the by-pass valve.

4. A meter connection bar according to claim 3 having, in addition, a check valve normally closing the vent passage-way in the outlet connecting means together with means providing access thereto whereby the check valve may be held in open position.

HOWARD HAZEN McCHESNEY.

REFERENCES CITED

The following references are of record in the file of this patent:

UNITED STATES PATENTS

| Number | Name | Date |
|---|---|---|
| 2,489,660 | Mueller | Nov. 29, 1949 |

FOREIGN PATENTS

| Number | Country | Date |
|---|---|---|
| 16,579 | Great Britain | 1910 |
| 518,560 | Germany | Feb. 17, 1931 |